United States Patent Office 3,583,942
Patented June 8, 1971

3,583,942
PROCESS FOR THE PRODUCTION OF MIXTURES CONTAINING BIS-(2 - HYDROXYETHYL) TEREPHTHALATE AND ITS OLIGOMERS
Jaroslav Malek, Pavel Cefelin, Boris Nahlovsky, and Vladimir Bazant, Prague, Czechoslovakia, assignors to Ceskoslovenska Akademie Ved, Prague, Czechoslovakia
No Drawing. Filed Jan. 26, 1968, Ser. No. 700,745
Claims priority, application Czechoslovakia, Feb. 2, 1967, 784/67
Int. Cl. C08q *17/013;* C07c *69/82*
U.S. Cl. 260—75          13 Claims

ABSTRACT OF THE DISCLOSURE

Mixtures consisting essentially of bis-(2-hydroxy-ethyl) terephthalate and at least one oligomer thereof are produced by reacting diammonium terephthalate and ethylene glycol in the presence of at least one esterification catalyst selected from the group consisting of oxygen compounds of titanium, germanium, tin, bismuth, antimony, zinc and triphenyl antimony and bismuth, all soluble in the reaction mixture, and removing the released ammonia and water as the reaction proceeds.

BACKGROUND OF THE INVENTION

Mixtures of bis-(2-hydroxyethyl) terephthalate and its oligomers, particularly its dimer are especially suitable for the preparation of high-molecular, fiber-forming polyesters.

Usually, bis-(2-hydroxyethyl) terephthalate is produced by transesterification of dimethyl terephthalate with ethylene glycol. Bis-(2-hydroxyethyl) terephthalate can be also obtained by a direct esterification of terephthalic acid with ethylene glycol under ordinary pressure and in the presence of catalysts as described, e.g., in the British Pat. 807,630, or, at an elevated pressure and temperature exceeding the boiling point of ethylene glycol in the absence of catalysts as shown, e.g., in British Pat. 827,373.

Terephthalic acid dinitrile can be also used as the starting material in the production of bis-(2-hydroxyethyl) terephthalate; esterification of intermediates of its hydrolysis, namely, of terephthalic acid diamide or diammonium terephthalate with ethylene glycol in the presence of alkaline catalysts, e.g., magnesium oxide and sodium hydroxide, or, zinc borate and lead oxide, and polycondensation of the primary condensate is described in British Pat. 805,855. Esterification of diammonium terephthalate with ethylene glycol in the presence of magnesium oxide, sodium methoxide, sodium hydroxide, or, calcium carbonate as catalysts is described in British Pat. 801,125. The reaction time in these cases varies from 7 to 24 hours.

According to British Pat. 799,059, a 96% yield of crude bis-(2-hydroxyethyl) terephthalate can be obtained in the course of 5.7 hours at the boiling point of ethylene glycol by reacting diammonium terephthalate with ethylene glycol in a ratio of 1:10 and in the presence of alkaline catalysts. Oxides, hydroxides, alcoholates, carbonates or bicarbonates of alkali metals and alkaline earth metals or, salts of these metals with weak inorganic or organic acids, e.g., silicates, borates, aluminates, acetates, propionates, stearates, palmitates, and oleates are used as alkaline catalysts, magnesium oxide, sodium methylate, and sodium terephthalate being indicated as the best catalyst.

It is an object of the present invention to provide a process for the production of mixtures containing bis-(2-hydroxyethyl) terephthalate and its oligimers which can be carried out in a particularly simple, economical and effective manner and will permit obtaining of the desired mixture in a very high yield.

SUMMARY OF THE INVENTION

According to the present invention, mixtures containing bis-(2-hydroxyethyl) terephthalate and its oligomers which are especially suitable for the preparation of high-molecular fiber-forming polyesters, can be obtained directly within a shorter reaction time, in high yields, large amounts per hour and per unit of reactor volume, and under practically complete exclusion of the formation of undesirable glycol ethers, especially diethylene glycol and its esters with terephthalic acid, by using as esterification catalysts oxygen compounds of titanium, germanium, tin, bismuth, antimony, zinc, and triphenyl derivatives of antimony and bismuth, and their mixtures, all soluble in the reaction mixture, and removing the released ammonia and water as the reaction proceeds.

Preferably, the mixture of bis-(2-hydroxyethyl) terephthalate and its oligomers is produced by heating diammonium terephthalate under an inert gas with an excess of ethylene glycol at temperatures between 160–260° C. in the presence of esterification catalysts, which are soluble in the reaction medium and selected from the group consisting of oxygen compounds of titanium, germanium, tin, bismuth, zinc, antimony, triphenyl derivatives of antimony and bismuth, or their mixtures, and, by the use of a 3 to 20-fold molar excess of ethylene glycol, the reaction being performed until 10–60% of oligomers, especially dimers, are obtained.

It is known that diethylene glycol, if present in the polyester, deteriorates fiber- and film-forming properties. The amount of the formed diethylene glycol depends, besides the temperature, on the concentration of free ethylene glycol present, and thus also on the concentration of the hydroxylic end groups. If bis-(2-hydroxyethyl) terephthalate is partly or fully replaced by its oligomers, the possibility of the forming of diethylene glycol is reduced from the very beginning of the polycondensation.

DESCRIPTION OF THE PREFERRED EMBODIMENTS

It now has been found that mixtures containing bis-(2-hydroxyethyl) terephthalate and its oligomers which are especially suitable for the preparation of high-molecular fiber-forming polyesters, can be obtained directly within a shorter reaction time, in high yields, large amounts per hour and per unit of reactor volume, and under practically complete exclusion of the formation of undesirable glycol ethers, especially diethylene glycol and its esters with terephthalic acid, by using oxygen compounds of titanium, germanium, tin, bismuth, antimony, zinc, and triphenyl derivatives of antimony and bismuth, said compounds being soluble in the reaction mixture and having lower acidity than needed for binding ammonia at reaction conditions, or, mixtures of said compounds as catalysts for the esterification of diammonium terephthalate with ethylene glycol.

It is therefore also proposed in accordance with the present invention to provide a process for the production of mixtures containing bis(2-hydroxyethyl) terephthalate and it is oligomers by heating diammonium terephthalate under an inert gas with an excess of ethylene glycol at temperatures between 160–260° C. in the presence of at least one esterification catalyst, which are soluble in the reaction medium and selected from the group consisting of oxygen compounds of titanium, germanium, tin, bismuth, antimony, zinc, and triphenyl derivatives of antimony and bismuth, all soluble in the reaction mixture, said compounds having lower acidity than under reaction conditions needed for binding ammonia, and, by the use of a 3 to 20-fold molar excess of ethylene glycol, the reaction being performed until 10–60% of oligomers, especially dimers, are obtained.

The dimer of bis-(2-hydroxyethyl) terephthalate, characterized by the formula

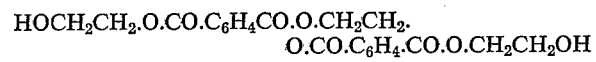

HOCH$_2$CH$_2$.O.CO.C$_6$H$_4$CO.O.CH$_2$CH$_2$.O.CO.C$_6$H$_4$.CO.O.CH$_2$CH$_2$OH and accompanying always the monomer in the esterification of diammonium terephthalate with ethylene glycol according to the process of invention represents from the point of view of the subsequent preparation of polyethylene terephthalate at least an equally valuable starting material as the monomeric bis-(2-hydroxyethyl) terephthalate, and its formation does not cause a loss of starting material.

The catalysts according to the process of invention are characterized also by the absence of any acidic group which could permanently bind the ammonia liberated by the reaction and thus interfere with the formation of terephthalic acid esters free of nitrogen.

Some of the compounds of the catalytically active metals according to the invention shown a different efficacy. Thus, e.g., titanium dioxide (in the form of the rutile pigment) is sparingly soluble in the reaction medium and shows a very low catalytic activity in contrast to the considerably more active metatitanic acid [prepared according to J. Res. NBS 56, 289 (1956) and Zhur. Neorg, Khim, 11, 3, 464 (1966)), and the slurry dried at 40° C./12 Torr], tetra(n-butoxy) titanium, and tetraethoxy)-titanium which are readily soluble in the reaction medium. An object of the invention thus consists in the use of some of the catalytically active metals in such a form or in such a compound which is soluble in the liquid phase of the reaction mixture for the esterification of diammonium terephthalate with ethylene glycol.

Concentration of the catalyst according to the invention may vary between 0.010 and 2% by weight, preferably between 0.125 and 1% by weight with respect to the diammonium terephthalate charged. Higher concentrations of the catalyst also may be used and the same product will be obtained but the reaction does not proceed at a substantially higher rate.

In the direct esterification of diammonium terephthalate into bis-(2-hydroxyethyl) terephthalate and its oligomers, the alcohol component is represented by ethylene glycol. When the catalysts according to the invention are used in this esterification, the amount of ethylene glycol preferably may vary between 3.20 moles, and most preferably between 4–8 moles per 1 mole of diammonium terephthalate.

The use of high concentrations of diammonium terephthalate in ethylene glycol corresponding, e.g. to the molar ratio of 1:4 to 1:8 and the possibility to perform the esterification even under these conditions substantially in a quantitative yield, permit to attain a high production per unit of reactor volume and per hour. This fact represents another advantage of the process of esterification according to the present invention in comparison with prior art methods.

The direct esterification is performed by heating diammonium terephthalate with pure ethylene glycol at temperatures of between 160–260° C., preferably at 190–230° C. in the absence of oxygen and in the presence of catalysts according to the invention with permanent removal of the liberated ammonia and water from the reaction system by passage of an iert gas, e.g., carbon dioxide free of oxygen, or argon, or nitrogen. The most advantageous arrangement consists in a fractional distillation of vapors leaving the reaction system and recycling the ethylene glycol without any loss to the reaction. Under these conditions according to the invention, moist diammonium terephthalate containing, e.g., 10% of water, may be used without affecting the quality of the product, the reaction time, or, the activity of the catalysts in the reaction mixture, e.g., of tetra(n-butoxy) titanium or tetra(ethoxy) titanium which are otherwise very sensitive and decomposed by exposure to atmospheric moisture.

When diammonium terephthalate containing up to $1 \times 10^{-5}$ percent by weight of iron is esterified, e.g., at the boiling point of ethylene glycol under the above mentioned conditions in the presence of e.g., metatitanic acid as catalysts, a practically colorless mixture is obtained by the reaction. This fact has a favorable influence on the quality of bis-(2-hydroxyethyl) terephthalate and its dimer. The fibre-forming polyester has to be practically colorless since otherwise it cannot be utilized for textile purposes. When less pure compounds are used as the starting material it may be advantageous to purify the products of esterification prior to the subsequent polycondensation preferably by crystallization from a suitable solvent, e.g., from water.

Some catalysts according to the process of invention, e.g., metatitanic acid, tetra(n-butoxy) titanium, tetra(ethoxy) titanium, zinc oxide, antimony ethylene glycolate or bismuth trioxide or hydroxide speed up the esterification to such an extent that to carry out the reaction at an elevated pressure, i.e., at temperatures above 196.5°, is of insignificant advantage. For this reason, the esterification of diammonium terephthalate at atmospheric pressure and preferably, at temperatures near the boiling point of ethylene glycol represents the procedure of choice under these conditions.

The high activity of catalysts according to the present invention permits to carry out the direct esterification of diammonium terephthalate with ethylene glycol preferably also continuously in a flow reactor, or, better, in a cascade of 2 to 3 reactors under conditions of temperature and concentration as described above in such a manner that the reactor or a cascade of reactors is continuously charged with a suspension of diammonium terephthalate, ethylene glycol, and the catalyst, or, with diammonium terephthalate, and, separately, a mixture of of ethylene glycol (preheated to the reaction temperature) and the catalyst. Ammonia and water which are formed by the reaction, are continuously removed from the system by passing a stream of an inert gas through the reactor, or, when the reaction is performed at elevated pressures, by means of a choke valve. The residence time of the reaction mixture in the reaction system depends on the activity of the catalyst used according to the invention. The reaction mixture lacking the bound ammonia or the free carboxyl group is removed continuously from the esterification system into an evaporator in which the excess ethylene glycol is distilled off under diminished pressure; the ethylene glycol is redistilled and recycled to the esterification system. The non-volatile remainder from the evaporator, i.e., a mixture of bis-(2-hydroxyethyl) terephthalate and its oligomers, is worked up by some of the following procedures.

When the direct esterification of diammonium terephthalate with ethylene glycol is performed at the temperature of e.g. 197.5° C., with the use of a molar ratio of the diammonium salt to ethylene glycol of 1:10, and at a concentration of the catalyst of 1% based on the weight of the charged diammonium terephthalate, bis-(2-hydroxyethyl) terephthalate and its dimer are formed in a substantially quantitative yield with respect to diammonium terephthalate within the reaction times shown in Table I.

TABLE I

| Catalyst | Yield (percent of theory) | | Reaction time (hours) |
|---|---|---|---|
| | BHET [1,3] | DIMER [2,3] | |
| Tetra(n-butoxy)titanium | 81.0 | 19.0 | 2.0 |
| Metatitanic acid (TiO$_2$.1H$_2$O) | 82.0 | 18.0 | 1.0 |
| Tetra(ethoxy)titanium | 80.5 | 19.5 | 1.7 |
| Titanium dioxide (rutile pigment) | 79.0 | 21.0 | 7.5 |
| Lead-titanium hexahydroxide | 83.0 | 17.0 | 2.0 |
| Stannous oxide | 80.0 | 20.0 | 3.0 |
| Di(n-butyl)tin oxide | 79.5 | 20.5 | 3.0 |
| Di(n-butyl)tin dilaurate | 78.5 | 21.5 | 3.8 |
| Tetra(n-butyl)tin | 72.5 | 27.5 | 4.5 |
| Zinc oxide | 81.0 | 19.0 | 2.5 |
| Zinc acetylacetonate | 80.5 | 19.5 | 3.0 |
| Zinc acetate | 83.5 | 16.5 | 3.5 |
| Bismuth hydroxide | 83.5 | 16.5 | 2.25 |
| Bismuth trioxide | 83.0 | 17.0 | 2.25 |
| Triphenylbismuth | 82.0 | 18.0 | 2.25 |
| Germanic oxide | 78.0 | 22.0 | 4.0 |
| Antimonous oxide | 77.5 | 22.5 | 6.75 |
| Triphenylantimony | 77.0 | 23.0 | 7.5 |
| Dihydroxyantimony acetate | 78.5 | 21.5 | 5.0 |

[1] The abbreviation BHET designates bis-(2-hydroxyethyl) terephthalate.
[2] DIMER=dimer of bis-(2-hydroxyethyl) terephthalate.
[3] Values determined by analysis.

The reaction time values in Table I designate the duration of the esterification to the moment when the reaction mixture does no more contain any analytically perceptible amounts of the bound ammonia or of the free carboxyl group.

When, for the sake of comparison, the esterification of diammonium terephthalate with ethylene glycol was performed under exactly the same conditions as above but with the use of 1% by weight of sodium methylate according to the British Pat. 799,059, a period of 11 hours was necessary to obtain the reaction mixture free of 2-hydroxyethyl terephthalate, i.e., of the free carboxyl group.

In all experiments shown in Table I, the concentration of both the free and bound (in the form of an ester) diethylene glycol in the resulting reaction mixture varied within the range of 0.05 to 0.15% by weight.

The effect of catalysts according to the invention, especially of those derived from titanium, zinc, tin, and bismuth becomes evident from the higher reaction rate as well as selectivity expressed, e.g., by the low content of diethylene glycol and thus the low content of compounds containing an etheral linkage in the resulting mixture of esters and the polyethylene terephthalate prepared from this mixture.

With the use of pure starting compounds, the reaction mixture resulting after removal of ethylene glycol by distillation can be directly subjected to the polycondensation under the formation of the fiber-forming polyethylene terephthalate. The purification of the reaction mixture, if required, may be performed as follows:

From the final reaction mixture the excess, unreacted ethylene glycol is distilled off under reduced pressure, and the solid residue is mixed and heated with a suitable solvent, e.g., water, to separate bis-(2-hydroxyethyl) terephthalate and its dimer. Thus, the hot suspension is filtered while hot to obtain the dimer which is practically insoluble in water, and the filtrate is cooled to the temperature between +5° C. and 0° C. to deposit crystalline bis-(2-hydroxyethyl) terephthalate. Both intermediates purified in this fashion are combined and subjected to the polycondensation.

The solid crystalline residue obtained after removal of ethylene glycol from the reaction mixture by distillation can be worked up, however, also directly without isolating each of the two constituents; when the reaction mixture is processed in this way, use is made of another additional property of the catalysts according to the process of invention, namely, the ability to catalyze to a greater or lesser extent also the polycondensation reaction under the formation of polyethylene terephthalate. According to this procedure, the solid distillation residue is subjected to polycondensation in a manner known per se, with or without the addition of a further polycondensation catalyst and stabilizer.

The esterification product may be isolated also by distillation, without removing the excess ethylene glycol namely, by cooling down directly the resulting reaction mixture to a temperature between +2° C. and 0° C. and filtering the deposited mixture of crystalline bis-(2-hydroxyethyl) terephthalate and its crystalline dimer utilizing a cooled filter. Further crystalline crops are obtained by concentration of the mother liquor, or the ethylene glycol filtrate is reused in the next esterification run.

The following examples illustrate but do not limit the scope of the process according to the present invention.

EXAMPLE 1

In a closed cylindrical glass vessel equipped with a stirrer, an inlet for pure nitrogen, and a condenser maintained at 105° C. by means of ethylene glycol circulating through the jacket, 77.5 g. (1.25 mole) of pure ethylene glycol were preheated 190° C., and 25 g. (0.125 mole) of diammonium terephthalate was added; under a simultaneous introduction of a stream of nitrogen and vigorous agitation, the temperature of the suspension was raised in the course of 5 minutes to 197.5° C., 0.25 g. of tetra(ethoxy)titanium was added as catalyst (1% by weight based on the charged diammonium terephthalate), and the mixture was maintained at this temperature under vigorous stirring and passing of a stream of nitrogen until the reaction was complete. After 45 minutes, the suspension changed into a homogeneous solution and after an additional 35 minutes, the reaction mixture was free of bound nitrogen and contained 2.8% of the theoretical amount of 2-(hydroxyethyl) terephthalate. After a total esterification period of 100 minutes, no free carboxyl group could be found in the reaction mixture which contained, as shown by analysis, 80.5% and 19.5% of the theoretical amount of bis-(2-hydroxyethyl) terephthlate and its dimer, respectively. As shown by gas chromatography, the content of free as well as the bound (in the form of an ester) diethylene glycol was 0.08% by weight.

From the practically colorless, completely clear reaction mixture, the excess of ethylene glycol was removed by vacuum distillation at 10 mm. Hg. The solid crystalline residue was briefly heated in 60 ml. of distilled water to the boiling point and the suspension filtered while hot through a heated filter. The white crystals on the filter, practically insoluble in water, were washed with 10 ml. of hot distilled water and dried to yield 5.3 g. of the dimer, i.e., 19% of the theoretical amount based on the charged amount of diammonium terephthalate. The clear mother liquor was combined with washings, the whole cooled to +2° C., the deposited crystals of bis-(2-hydroxyethyl) terephthalate collected, and dried at 40° C. and 12 mm. Hg., melting point 108–111° C.; concentration of the mother liquor yielded an additional crop of crystals which melted within the same temperature range. The yield of bis-(2-hydroxyethyl) terephthalate was 24.8 g., i.e., 78% of the theoretical amount based on the amount of charged diammonium terephthalate. Recrystallization of the bis-ester thus prepared from water and removal of the accompanying dimer by means of the above procedure yielded the bis-ester melting at 109–110.5° C. Upon recrystallization of the bis-ester from n-butanol, its melting point was found to be 109.5–110.5 C.

The overall yield of bis-(2-hydroxyethyl) terephthalate and its dimer was 97% of the theoretical amount based on the initially introduced diammonium terephthalate.

EXAMPLE 2

The esterification of diammonium terephthalate with ethylene glycol was performed under the same conditions as in Example 1 but with the use of 0.062 (0.25% by weight based on the charged diammonium terephthalate) of tetra(n-butoxy)-titanium instead of 0.25 g. of tetra-(ethoxy)titanium as catalyst and 26.25 g. of diammonium terephthalate containing 5% by weight of moisture (this amount corresponds to 25 g. of the 100% diammonium terephthalate and 1.25 g. of water) instead of the 100% diammonium terephthalate.

Within 80 minutes, the reaction mixture became homogeneous and within a total of 210 minutes was free of bound nitrogen and free carboxyl group. As shown by analysis, the mixture contained 88.2% and 11.8% of bis-(2-hydroxyethyl) terephthalate and its dimer, respectively, and 0.10% by weight of both the free and bound (in the form of the ester) diethylene glycol.

The volatile portions of the reaction mixture were distilled off under nitrogen in vacuo (at 10 mm. Hg.) and the solid (after cooling) white distillation residue (32.7 g.) worked up to bis-(2-hydroxyethyl) terephthalate and its dimer by the procedure described in Example 1. Both products were combined and the mixture heated with 0.05% by weight of antimonous oxide as the polycondensation catalyst in an argon atmosphere under a simultaneous lowering of the pressure. After 80 minutes at 0.1 to 1 mm. Hg at a maximum temperature of 280–285° C., polyethylene terephthalate was obtained of a quality particularly suited for spinning into fibers of satisfactory properties. Intrinsic viscosity 0.64 as determined at 25° C. in a 0.5% solution of the polycondensate in equal parts (by weight) of phenol and carbon tetrachloride.

EXAMPLES 3 to 9

Esterification of diammonium terephthalate with ethylene glycol was repeated in the same manner as described in Example 1 and under the same temperature conditions but with the use of 1% by weight of tetra(n-butoxy)titanium as catalyst (based on the charged diammonium terephthalate), the molar ratio of the salt to ethylene glycol being carried within the range of from 1:20 to 1:3. The results obtained according to examples 3 to 9 are listed in Table II and compared, showing the advantageous features of the present invention, as compared with the optimum results of esterification of diammonium terephthalate obtained according to the British Pat. 799,059 (Examples A and B) and according to the same patent with the use of the molar ratio of 1:7 and 1:3 (Examples C and D).

38.7 g. (0.0625 mole) of pure ethylene glycol preheated to 100° C., and 0.25 g. (2% by weight, based on diammonium terephthalate) of antimony ethylene glycolate as catalyst, and the autoclave was flushed with nitrogen; in the course of 20 minutes, the contents of the autoclave were heated to a temperature of 225° C. and this temperature was maintained for a period of 4.5 hours with intermittent release of pressure. After the stated time, the reaction was substantially complete and neither bound ammonia nor free carboxyl could be found analytically in the reaction mixture. As shown by analysis, the reaction mixture contained 63% and 37% of the theoretical amount (based on the charged diammonium terephthalate) of bis-(2-hydroxyethyl) terephthalate and its dimer, respectively.

The product was worked up in analogy to the Example 1. After crystallization from water, the dimer melted at 168–172° C. and the melting point of bis-(2-hydroxyethyl) terephthalate was 109–111° C.

Both products were combined and subjected to polycondensation in accordance with the procedure described in Example 2. The resulting polymer melted at 261° C. and its intrinsic viscosity was 0.62.

EXAMPLE 11

Esterification of diammonium terephthalate with ethylene glycol was repeated according to Example 1, but with the use of 0.125 g. (0.5% by weight, based on the charged diammonium terephthalate) of metatitanic acid. The reaction was complete after 60 minutes. The reaction mixture did not contain any free carboxyl or bound ammonia. The practically quantitative reaction yielded 83% and 17% of bis-(2-hydroxyethyl) terephthalate and its dimer, respectively. After removal of the excess of ethylene glycol by vacuum distillation (at 10 mm. Hg) under nitrogen and cooling down the distillation residue, there was obtained 31 g. of a crystalline mass of bis-(2-hydroxyethyl) terephthalate and its dimer, i.e., 1.31 moles were produced per hour and liter of the esterification reactor. Both products were combined and subjected to polycondensation according to the Example 2. The resulting polymer melted at 261–262° C. and its intrinsic viscosity was 0.64.

Without further analysis, the foregoing will so fully reveal the gist of the present invention that others can by applying current knowledge readily adapt it for various

TABLE II

| Example No. | Molar ratio diammonium terephthalate to ethylene glycol | Reaction temperature, °C. | Reaction time, hours | Yield of the esterification based on diammonium terephthalate in percent of theory | | Overall yield of BHET[1] and the DIMER[2] based on diammonium terephthalate after isolation in percent of theory | Moles[3] of BHET[1] and the DIMER[2] per 1 hr. and per 1 l. of the reactor volume |
|---|---|---|---|---|---|---|---|
| | | | | BHET[1] | DIMER[2] | | |
| 3 | 1:20 | 197.5 | 1.5 | 89 | 11 | 97 | 0.48 |
| 4 | 1:15 | 197.5 | 1.8 | 88 | 12 | 96 | 0.53 |
| 5 | 1:10 | 197.5 | 2.0 | 81 | 19 | 97 | 0.65 |
| 6 | 1:8 | 197.5 | 2.0 | 79 | 21 | 96.5 | 0.77 |
| 7 | 1:6 | 197.5 | 2.5 | 71 | 29 | 98 | 0.88 |
| 8 | 1:4 | 197.5 | 3.25 | 67 | 33 | 97 | 0.92 |
| 9 | 1:3 | 197.5 | 3.5 | 49 | 51 | 96.5 | 1.04 |
| A[4] | 1:10 | 196.7 | 5.7 | 100 | | [5] 96 | 0.24 |
| B[4] | 1:15 | 196.7 | 5.5 | 100 | | [5] 98 | 0.18 |
| C[6] | 1:7 | 196.7 | 24 | | | [5] 85 | 0.065 |
| D[6] | 1:3 | 196.7 | 24 | | | [5] 15 | 0.019 |

[1] BHET=bis-(2-hydroxyethyl) terephthalate.
[2] DIMER=the dimer of bis-(2-hydroxyethyl) terephthalate.
[3] The following relationship was used: 1 mole of the DIMER=2 moles of BHET.
[4] Optimum results as reported in British Pat. 799,059. The results were obtained under practically the same conditions but with the use of 1% by weight (based on diammonium terephthalate) of sodium methoxide as catalyst.
[5] The values 96, 98, 85, and 15%, resp., refer to BHET.
[6] Examples C and D are those reported in the British Pat. 799,053 and are reproduced for the sake of comparison with Examples 6, 7, and 9 of the present invention.

EXAMPLE 10

An autoclave (volumn 110 ml.) equipped with a stirrer, a deaerating valve, and a theromoelement was charged with 12.5 g. (0.0625 mole) of diammonium terephthalate, applications without omitting features that, from the standpoint of prior art, fairly constitute essential characteristics of the generic or specific aspects of this invention and, therefore, such adaptations should and are in-

What is claimed as new and desired to be protected by Letters Patent is set forth in the appended claims:

1. A method of producing a mixture consisting essentially of bis-(2-hydroxyethyl) terephthalate and at least one oligomer thereof, the said method comprising the steps of reacting diammonium terephthalate with a 3 to 20 times molar excess of ethylene glycol by heating the mixture of these two components to a temperature between 160 and 260° C. in the absence of oxygen and in the presence of at least one esterificiation catalyst selected from the group consisting of metatitanic acid, tetra (n-butoxy) titanium, tetra(ethoxy) titanium, titanium dioxide, lead titanium hexahydroxide, zinc oxide, zinc acetate, zinc acetylacetonate, stannous oxide, di(n-butyl) tin oxide. di(n-butyl) tin dilaurate, tetra (n-butyl) tin, bismuth trioxide, triphenylbismuth, bismuth hydroxide, germanic oxide, tetra(ethoxy) germanium, antimonous oxide, tris (2-hydroxyethyl) antimony, tiphenylantimony, dihydroxyantimony acetate, and antimony ethylene glyocolate, which catalyst is readily soluble in the liquid phase of the reaction mixture and is present in an amount from 0.01 to 2% by weight relative to the diammonium terephthalate, ammonia and water being liberated in said reaction; and removing said liberated ammonia and water as the reaction proceeds until a mixture of said bis-(2-hydroxyethyl) terephthalate and from 10 to 60% of at least one oligomer thereof is obtained.

2. A method as defined in claim 1, wherein said reacting is continued until the yield of bis(2-hydroxyethyl) terephthalate and oligomers thereof is higher than 95% based on diammonium terephthalate.

3. A method as defined in claim 1, wherein said reacting is carried out for a period of up to about five hours and until the thus-obtained mixture consists of between about 10 and 60% of said oligomer.

4. A method as defined in claim 1, wherein said reacting is carried out in such a manner that said oligomers will consist predominantly of the dimer of bis(2-hydroxyethyl) terephthalate.

5. A method as defined in claim 1, wherein said diammonium terephthalate, ethylene glycol and catalyst are continuously introduced into and reacted in a reaction vessel, and the esterified reaction mixture obtained thereby is continuously removed from said reaction vessel.

6. A method as defined in claim 5, wherein said catalyst is mixed with ethylene glycol, the mixture is preheated to said reaction temperature and said diammonium terephthalate and the thus preheated mixture of said catalyst and said ethylene glycol are continuously and separately introduced into said reaction vessel.

7. The method of claim 1 wherein unreacted ethylene glycol is removed by vacuum distillation from the reaction mixture of said diammonium terephthalate and said oligomer and the thus-obtained solid residue is mixed and heated in a solvent medium to a temperature at which said bis(2-hydroxyethyl) terephthalate is soluble in said medium and at which said oligomer is only slightly soluble therein; filtering the thus-obtained mass so as to separate said oligomer from said bis(2-hydroxyethyl) terephthalate; cooling the thus-obtained filtrate to a temperature sufficiently low to substantially precipitate said dissolved bis(2-hydroxyethyl) terephthalate; and separating the thus-formed precipitate from said solvent.

8. A method as defined in claim 7, wherein said solvent consists substantially of water and said cooling is carried out to a temperature between about +5 and 0° C.

9. A method as defined in claim 1 wherein ethylene glycol is removed from the thus-obtained esterification mixture by distillation at sub-atmospheric pressure and the thus-obtained distillation residue consisting essentially of a mixture of bis(2-hydroxyethyl) terephthalate and its dimer is directly subjected to condensation in the presence of further amounts of catalyst as defined in claim 1 so as to form polyethylene terephthalate.

10. The method of claim 9 wherein the condensation of the mixture of bis(2-hydroxyethyl) terephthalate and its dimer is carried out in the presence of 0.05% of antimonous oxide as catalyst in an inert atmosphere at a reduced pressure.

11. The method of claim 1 wherein the catalyst is present in an amount from 0.125 to 1% by weight of the diammonium terephthalate.

12. The method of claim 1 wherein residual excess ethylene glycol is removed from said final mixture by distillation.

13. The method of claim 1 wherein the ethylene glycol is used in a 4 to 8 times molar excess.

References Cited

UNITED STATES PATENTS

| | | | |
|---|---|---|---|
| 2,926,189 | 2/1960 | Hadley et al. | 260—75X |
| 3,245,959 | 4/1966 | Roeser | 260—75 |
| 3,457,297 | 7/1969 | Muller | 260—75X |

WILLIAM H. SHORT, Primary Examiner

L. P. QUAST, Assistant Examiner

U.S. Cl. X.R.

260—475